United States Patent [19]

Hutchins et al.

[11] 4,437,986

[45] Mar. 20, 1984

[54] SEPARATING DEVICE AND CARTRIDGE THEREFOR

[75] Inventors: Charles K. Hutchins; Donald I. Thornton; Richard H. Peyton, all of East Providence, R.I.

[73] Assignee: Fram Corporation, East Providence, R.I.

[21] Appl. No.: 421,613

[22] Filed: Sep. 22, 1982

[51] Int. Cl.³ .......................................... B01D 27/10
[52] U.S. Cl. ................................. 210/130; 210/149; 210/184; 210/416.4; 210/DIG. 5
[58] Field of Search ................ 210/86, 114, 115, 130, 210/131, 137, 416.4, DIG. 5, 180, 184

[56] References Cited

U.S. PATENT DOCUMENTS

| | | | |
|---|---|---|---|
| 1,107,485 | 8/1914 | Bowser | 210/DIG. 5 |
| 3,187,895 | 6/1965 | Pall et al. | 210/114 |
| 3,508,658 | 4/1970 | McVay | 210/114 |
| 4,091,265 | 5/1978 | Richards et al. | 210/184 |
| 4,126,553 | 11/1978 | Berg | 210/130 |
| 4,253,954 | 3/1981 | Midkiff et al. | 210/DIG. 5 |
| 4,276,161 | 6/1981 | Matsui et al. | 210/86 |
| 4,321,136 | 3/1982 | Matsui | 210/86 |
| 4,372,847 | 2/1983 | Lewis | 210/86 |

*Primary Examiner*—John Adee
*Attorney, Agent, or Firm*—Ken C. Decker; W. N. Antonis

[57] ABSTRACT

Separating device for separating the liquid components of a liquid mixture comprising an annular coalescing medium (84) for causing the liquid component to be removed from the mixture to coalesce into droplets, and a conical separating medium (102) tapering toward a liquid collecting sump (98). A heating element (46) heats the liquid mixture when the temperature of the mixture is below a predetermined temperature. An open, fibrous batt of filtering material (100) circumscribes the coalescing medium (84) to collect wax crystals which form during cold temperature conditions. A relief valve (108) permits liquid to bypass the separating medium (102) when the pressure differential across the separating medium (102) exceeds a predetermined amount. Accordingly, initial flow through the separating device is established, permitting the heater to heat the liquid to a temperature above that at which wax crystals form.

13 Claims, 6 Drawing Figures

SEPARATING DEVICE AND CARTRIDGE THEREFOR

This invention relates to a separating device for separating the liquid components of a liquid mixture, and is particularly useful for removing water and other contaminants from the fuel oil in a diesel engine fuel supply system.

Separating devices have been proposed before. They are of the type which include a casing having inlet and outlet connections adopted for communication to a liquid flow system, an annular coalescing medium within the casing for causing the liquid component to be separated from the mixture to agglomerate into liquid droplets, the coalescing medium having inner and outer surfaces, a sump defined within said casing for collecting the liquid to be separated from the liquid mixture, means within the casing for deflecting liquid flow through the inlet connection to the outer surface of the coalescing medium, and a separating medium within the casing for separating the droplets coalesced by the coalescing medium from the liquid mixture.

This type of separating device is shown, for example, in U.S. Pat. No. 4,276,161 issued June 30, 1981 and U.S. Pat. No. 4,321,136 issued Mar. 23, 1982, both to Matsui et al. Unfortunately, one problem inherent in the devices disclosed in the Matsui et al patents and other devices known to prior art is the phenomenon known as "waxing". When certain liquids, such as diesel fuel, are cooled to a sufficiently low temperature, wax crystals are formed. In normal diesel fuel systems, formation of some wax crystals is not a severe problem because such systems are equipped with heaters which heat the fuel during operation of the engine to a temperature above that at which the wax crystals form. However, the wax crystals in the fuel do become a problem if the fuel system is equipped with a fuel oil filter and/or separator, because the wax crystals are a contaminant which may plug the fuel filter and/or separator media, thereby causing an insufficient flow of fuel to the vehicle engine. Another problem inherent in diesel fuel oil/water separators is that some of the coalesced water particles may find their way to the outlet of the separator, particularly when the water content of the fuel oil is high.

The present invention avoids the drawbacks of the prior art by providing a relief valve which bypasses the separating medium when the pressure differential across the separating medium exceeds a predetermined level, and by providing a batt of loosely woven fibrous material circumscribing the coalescing medium to collect the wax particles before they have a chance to contaminate the coalescing medium. Accordingly, fuel flow thrugh the water separator is sufficient to permit heating elements to warm the fuel to a point where waxing is no longer a problem, at which point the fuel oil/water separator functions normally. The invention also provides a conical separating medium which points towards the sump which receives the water droplets. Because of the conical shape, water particles are much more likely to gather on the separating material and drop directly in the sump than they were in devices known in the prior art.

The present invention is characterized by relief valve means responsive to a predetermined pressure differential across the separating medium to permit flow of said liquid mixture to bypass said separating medium, said coalescing medium comprising a batt of randomly arranged fibrous filtering material circumscribing a second filtering material that is more restrictive to liquid flow than is the batt. The invention is further characterized in that a conical separating medium is provided coaxial with the coalescing medium when the liquid mixture flowing from the inner surface of the coalescing medium to the separating medium causes at least some of the coalesced liquid droplets to be removed from the mixture and to deposit in the sump, and the conical surface of the separating medium being a material repellent to the liquid to be removed from the mixture so that droplets of the liquid to be removed deposit on the conical surface and fall to the sump while the other liquid of the liquid mixture passes therethrough.

The present invention has the advantageous effects of providing a relatively compact heater within the separator housing itself to heat the liquid mixture as it passes therethrough, by providing a batt of less dense filter material circumscribing the more dense coalescing medium in order to trap wax particles on the fibers of the batt that would otherwise plug the coalescing medium, and by providing a relief valve that permits liquid flow to bypass the separating medium during cold weather viscous flow conditions, thereby permitting flow of fluid through the separator while the heater heats the liquid mixture to a satisfactory range. Another advantageous effect of the invention is the design of the separator cartridge, in which a conical shaped separating medium enhances removal of water from the fuel oil mixture and by the provision of a baffle between the separating and coalescing mediums so that the liquid mixture must make a 180° turn in order to reach the separating medium, thereby even further enhancing the likelihood that water droplets coalesced by the coalescing medium will remove themselves from the flow and fall into the sump.

Although a specific embodiment of the invention has been disclosed herein, the scope of the invention is not limited thereto, and many variations of the concepts disclosed herein are possible. Accordingly, the scope of the invention is limited only by the scope of the appending claims.

Figure 1:
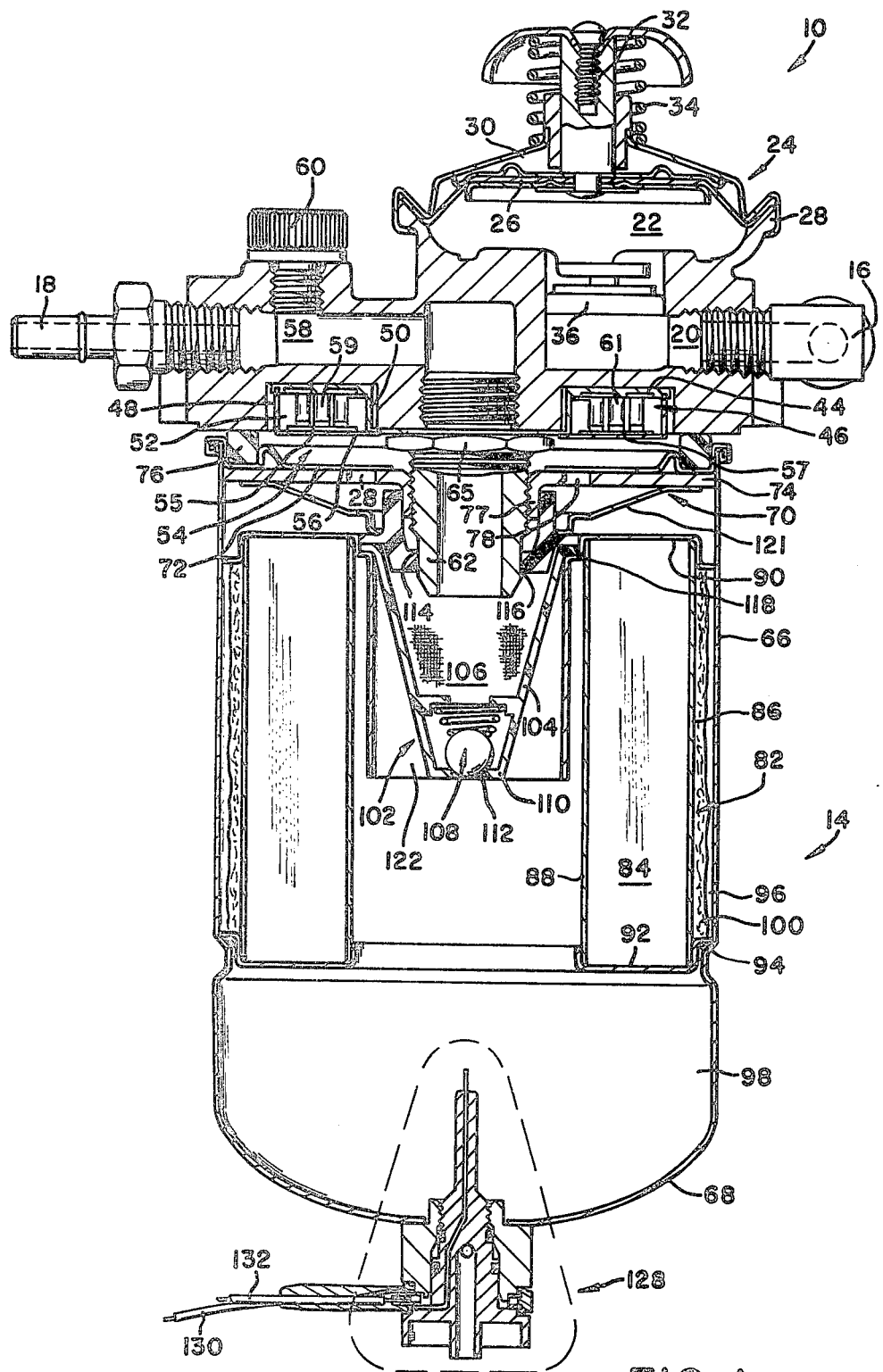
FIG. 1 is a longitudinal cross-sectional view of a separating device made pursuant to the teachings of our present invention, taken substantially along lines 1—1 of FIG. 2.
Figure 2:
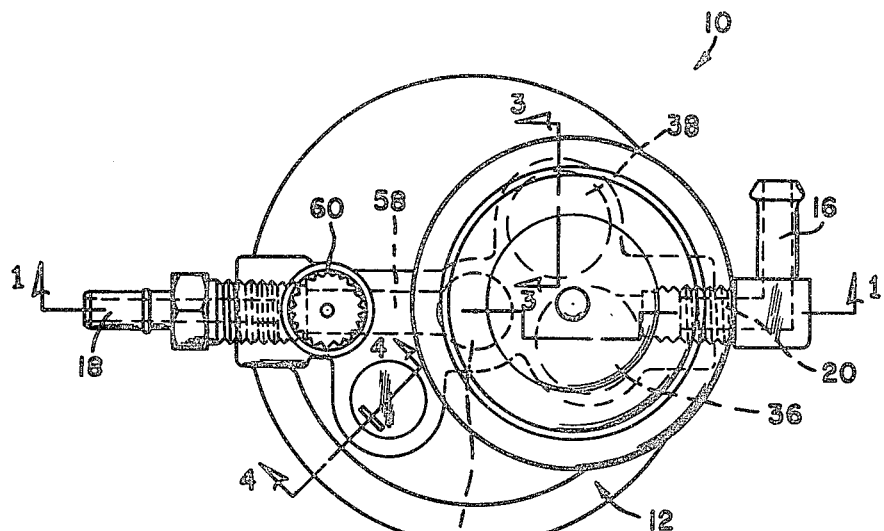
FIG. 2 is a top plan view of a separator made pursuant to the teachings of our present invention.
Figure 3:
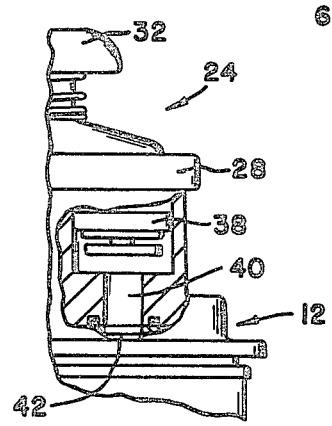
FIG. 3 is a fragmentary partial cross-sectional view taken substantially along lines 3—3 of FIG. 2.

Referring now to the drawings, a separator device for separating an immiscible component from a fluid mixture, such as separating water from diesel fuel oil in the fuel supply system of an automobile equipped with a diesel engine, is indicated generally by the numeral 10. Separating device 10 includes a housing or mount 12, which is secured, for example, to an automotive vehicle, and a replaceable separator cartridge generally indicated by the numeral 14 which is carried on the housing 12 and which is replaceable at normal maintenance intervals. The housing 12 is provided with an inlet fitting 16 and an outlet fitting 18 for connection in the aforementioned fuel supply system of a motor vehicle. The inlet fitting 16 communicates with an inlet passage 20 which communicates fluid from the inlet fitting 16 into the pumping chamber 22 of a hand operated primer pump generally indicated by the numeral 24. A one-way check valve 36 permits fluid communication from the inlet fitting 16 into the pumping chamber 22, but prevents communication in the reverse direction.

The primer pump 24 includes a pumping diaphragm 26 which is sealingly secured at its outer periphery to circumferentially extending portion 28 of the housing 12. The diaphragm 26 separates the pumping chamber 22 from a vented chamber 30. A reciprocally mounted, hand operated plunger 32 is secured to the diaphragm 26 and is adapted to move the latter toward and away from the housing 12 when the plunger 32 is operated. A spring 34 yieldably urges the plunger 32 upwardly viewing the figure. A check valve assembly 36 permits communication of liquid mixture into the pumping chamber 22 from the inlet fitting 16, but prevents communication in the reverse direction. A second check valve 38 permits communication from the pumping chamber 22 into a passage portion 40 downstream of the pumping chamber 22, but prevents communication in the reverse direction.

Passage portion 40 communicates liquid through an opening (not shown) 42 in top portion 44 of an annular heating element 46. Heating element 46 also includes annular side portions 48, 50 and a bottom portion 56 which cooperate with the portion 44 to define an annular duct 52 through which the liquid is communicated. The bottom portion 56 is provided with an opening (not shown) which permits fluid to communicate from the duct 52 into the annular chamber 54. A pair of circumferentially spaced discs 55, 57 are installed in the duct 52 and are held against the bottom portion 56 by leaf springs 59, 61. Discs 55, 57 are available commercially and are made from a Positive Temperature Coefficient (PTC) electrically resistive material.

The outlet fitting 18 communicates with a passage 58 within the housing 12. A manually operable vent 60 is opened to vent the passage 58 when the cartridge 14 is initially charged with liquid. Operation of the primer pump 24 pressurizes the system to move liquid from the inlet fitting 16 to the outlet fitting 18 while purging the air which is displaced by the liquid through the vent 60, as will be more completely described hereinafter. The passage 58 terminates in a threaded stud 62 on which the removable cartridge 14 may be engaged. The bottom portion 56 of element 46 is fastened on the stud 60 by a nut 65.

The cartridge 14 comprises a casing 66 having a closed end 68 and an opposite open end. The open end of the casing 66 is closed by a reinforced bottom or tapping plate 70. The tapping plate 70 comprises a lightweight portion 72 which is crimped to the periphery of the open end of the casing 66 in a manner common in the art, and also includes a heavier portion 74 which is fastened to the lighter portion 72. A circumferentially extending seal 76 is retained in the groove on the lighter portion 72 and provides a sealing connection between the casing 66 and the housing 12 when the cartridge 14 is installed thereon. The heavier plate 74 includes an axially extending portion 77 which is threaded to engage the stud 62 when the cartridge 14 is installed on the housing 12. The tapping plate 70 is provided with a number of circumferentially spaced openings 78 which communicate fluid from the annular chamber 54 into the casing 66.

Mounted in the casing 66 is a coalescing medium generally indicated by the numeral 82 which comprises a conventional circumferentially extending array of radially tapering pleats of paper 84. Coalescing medium 82 also includes an outer support member or screen 86, an inner support member or screen 88, an upper end cap 90, and a lower end cap 92. The lower end cap 92 is sealed to the walls of the casing 66 by a circumferentially extending seal 94, to thereby prevent fluid communication between a chamber 96 defined by the medium 82 and the wall of the casing 66 and a sump 98 defined by the end cap 92, the seal 94 and the bottom wall 68 of the casing 66. The coalescing medium 82 also includes a circumferentially extending batt of a conventional fibrous filtering medium 100. The fibrous filtering medium 100 circumscribes the outer screen 86 and is comprised of randomly arrayed non-woven fibers having a density much less than the density of the pleated paper medium 84.

Mounted coaxially within the coalescing medium 82 is a conically-shaped separating medium generally indicated by the numeral 102. The separating medium 102 comprises circumferentially spaced supports 104 upon which a conventional separating membrane 106 is mounted. The separating medium 102 tapers towards the sump 98, so that water droplets coalesced by the coalescing medium 82 and separated out by the membrane 106 are permitted to fall down into the sump 98 due to the conical shape of the separating medium 102. The separating medium 102 is coaxial with the stud 62 so that liquid flowing through the membrane 106 may also flow upwardly through the stud 62 into the passage 58. A relief valve generally indicated by the numeral 108 is mounted in the tip 110 of the medium 102, and opens to permit liquid flow through the passage 112 in the tip of the separating medium 102 when the pressure differential across the membrane 106 exceeds a predetermined level.

A circumferentially extending seal 114 circumscribes the stud 62 and includes a portion 116 which projects into the larger diameter end of the conical separating medium 102, to provide a sealing connection with the stud 62. The seal 114 also engages with the threaded portion 77 of the plate 74, and still another portion 118 is clamped between the upper circumferential surface of the conical separating medium 102, and the end cap 90 by a spring member 121. A circumferentially extending baffle 122 projects downwardly from the upper end cap 90 and is coaxial both with the inner screen 88 and with the separating medium 102. The baffle 122 is impervious to liquid flow.

Figure 4:
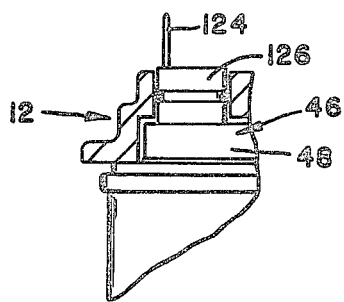
FIG. 4 is a fragmentary cross-sectional view taken substantially along lines 4—4 of FIG. 2.

Two electrical connections are necessary with respect to the separating device 10. The discs 55, 57 are supplied with electrical energy through a terminal 124 (FIG. 4) which projects from the top of the housing 12 and is connected to a portion 126 extending from the upper part 44 of the heating element 46. The casing 66 is also provided with a combination drain for the sump 98 and warning probe assembly generally indicated by the numeral 128. A pair of conductors 130, 132 connects the probe assembly and water drain 128 with electrical ground and with a warning light on the vehicle dashboard respectively to thereby indicate, as will be more completely described hereinafter, that the sump 98 contains water and should be drained.

Figure 6:
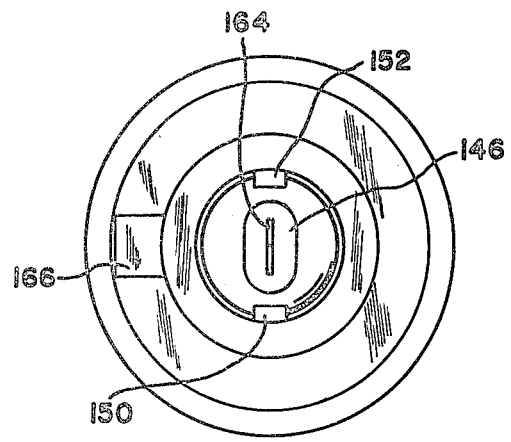
FIG. 6 is a view taken substantially along lines 6—6 of FIG. 5 illustrating the tip and body portions of the probe assembly.

The probe assembly 128 includes an annular fitting 136 secured to the bottom of the sump 98 and defining a stepped bore 138 therewithin having a smaller diameter portion 140 and a larger diameter portion 142. An electrically conductive probe 144 is carried in an insulative housing 146. The housing 146 is threaded as at 148 to threadedly engage a corresponding threaded portion on the fitting 136. The threaded portion 148 is interrupted by circumferentially spaced drain slots 150, 152 which are most clearly shown on FIG. 6, and which extend axially through the threaded portion 148 to permit fluid to drain as will be hereinafter described.

Figure 5:
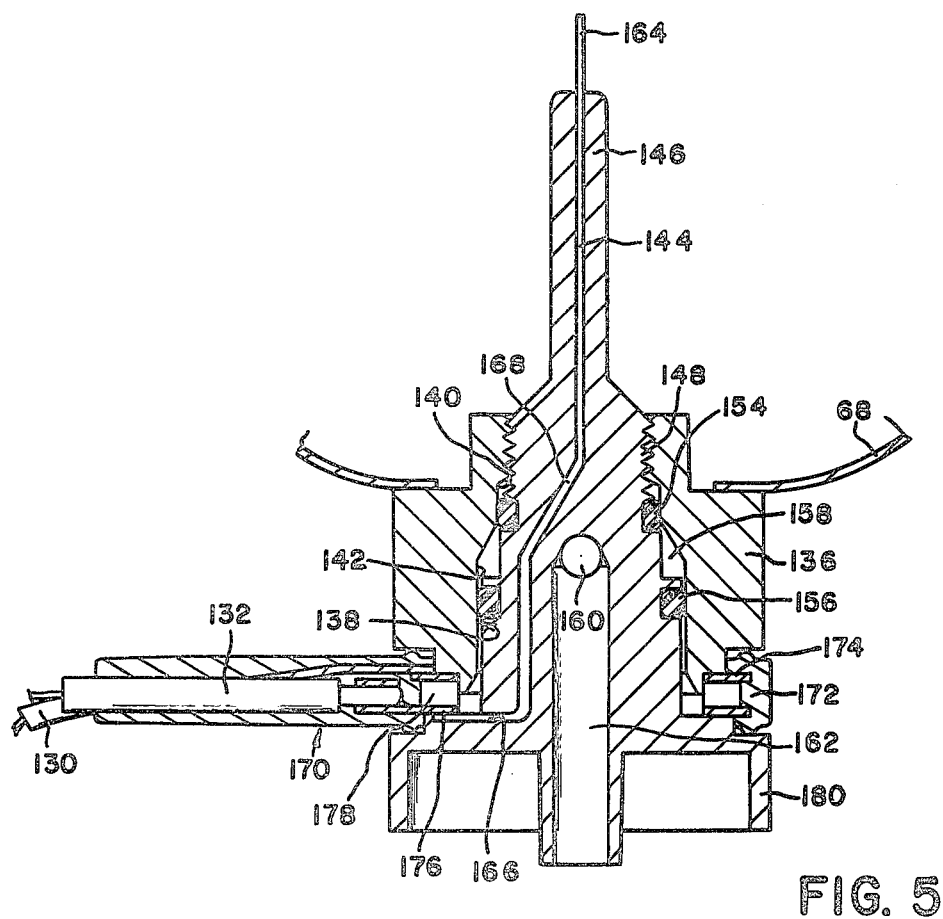
FIG. 5 is an enlarged longitudinal cross-sectional view of the circumscribed portion of FIG. 1.

The insulative housing 146 further carries axially spaced, circumferentially extending O ring seals 154, 156. The O ring seal 154 engages the smaller diameter portion 140 of the fitting 136 and the large diameter seal 156 engages the larger diameter portion 142 of the fitting 136. The seals 154, 156 and the corresponding portions of the housing 146 and the fitting 136 cooperate to define an annular cavity 158. A radially extending passage 160 communicates the cavity 158 with an axially extending passage 162 which extends through the lower portion (viewing FIG. 5) of the housing 146. One end 164 of the probe 144 projects from the corresponding end of the housing 146 to be exposed to the liquid content in the sump 98, and the other end of the probe 144 terminates in a transversely projecting portion 166. The prove 144 also includes an intermediate portion 168 which bends around, and is circumferentially spaced from, the radial passage 160 and longitudinal passage 162.

A terminal assembly generally indicated by the numeral 170 connects the conductors 130, 132 with the probe assembly. The terminal assembly includes a circumferentially extending portion 172 which circumscribes the fitting 136 and housing 146. A pair of axially spaced rings 174, 176 are carried in the circumferentially extending ring-like portion 172 of terminal assembly 170, and circumscribe the housing 146. The ring 174 is exposed for electrical engagement with the fitting 136, and a block of electrically insulative material 178 isolates the ring 174 from the ring 176. The ring 176 is connected to the conductor 132, and is exposed for electrical contact with the transversely projecting portion 166 of the probe 144. As can most clearly be seen in FIG. 5, the ring 176 will be in electrical contact with the transversely projecting portion 166 regardless of the angular orientation of the projecting portion 166.

In operation, the inlet and outlet fittings 16, 18 of the separating device 10 are installed in an appropriate liquid flow system, such as the fuel supply system to a motor vehicle diesel engine. Liquid communicated through the inlet fitting 16 passes through the inlet passage 20 and then flows through check valves 36 and 38 into passage portion 40. Liquid then flows from passage portion 40 into the duct 52. When the temperature of the liquid is sufficiently low, the heating discs 55, 57 heat the fuel oil to a temperature high enough to avoid the "waxing" problem, as will be hereinafter described. The liquid mixture then flows from the heating element 46 into the annular chamber 54 through the aforementioned openings (not shown) in support plate 56. Liquid in the annular chamber 54 is communicated through the openings 78 into the cartridge 14. Liquid in the cartridge is deflected by the end cap 90 into the annular chamber 96. The liquid mixture then passes into the coalescing medium 82. Flow of liquid through the coalescing medium 82 causes the liquid to be separated out of the mixture, such as water from a mixture of fuel oil and water, to agglomerate into water droplets. As these water droplets appear on the inner screen 88 of the coalescing medium 82, gravity causes most of the particles to fall into the sump 98. The liquid mixture, now relieved of at least some of the water or other liquid component to be removed, now flows around the end of the impervious baffle 122. The baffle 122 assures that the liquid flow reverses direction before entering the separating medium 102. This reversal of direction, from the generally downwardly movement viewing FIG. 1 of the liquid mixture from the openings 78 through the chamber 96 and the coalescing medium 82 to the generally upwardly flow of the liquid mixture into the separating cartridge 102, further encourages any droplets of the heavier component (such as water) that is to be removed from the mixture to fall into the sump. The membrane 106 of the separating medium 102 is repellent to, for example, water, so that any of the water droplets remaining in the liquid mixture will collect on the surface of the membrane, and, because of the conical shape of the membrane, will tend to drain downwardly viewing FIG. 1 into the sump 98. The liquid, now relieved of the liquid component removed by the separator, then flows through the threaded stud 62 into the passage 58 and out of the outlet fitting 18.

The liquid component removed from the liquid mixture by the separating device 10 will gradually fill the sump 98. The sump 98 is initially filled with the liquid mixture which, in the case of a mixture of fuel oil and water in which the water contaminant makes up only a very small percentage of the total mixture, the conductivity of the mixture is such that a high impedance circuit will exist between the projecting portion 164 of the probe and the grounded fitting 136, so that a high impedance circuit between the conductors 130, 132 is present. Accordingly, the aforementioned dashboard light (not shown) will be turned off. However, as water is removed from the liquid mixture and fills the sump 98, the impedence of the electrical circuit between the probe 144 and the fitting 136 will be abruptly reduced when the level of the water reaches the projecting portion 164. When this occurs, the dashboard light is turned on through a conventional control circuit (not shown) which responds to the change of impedence. Accordingly, the vehicle operator is warned that the sump 98 must be drained. Draining the sump 98 is accomplished by manipulating the portion 180 of the probe assembly to unscrew the housing 146 from the fitting 136 until the O ring seal 154 is moved out of the smaller diameter portion 140 of the bore 138 and into the larger diameter portion 142 of the latter. When this occurs, water in the sump 98 drains into the circumferentially extending cavity 158. The O ring seal 156 protects the connection between the probe transversely extending portion 166 from water contamination. Water in the cavity 158 drains through radially extending passages 160 and axially extending passage 162 to the exterior of the separator 10.

The sump 98 may be purged of water without introducing air into the sytem by first opening the drain as described hereinabove and by then manipulating the plunger 32 of the primer pump 24, to thereby force the liquid mixture from the inlet fitting 16 into the cartridge 14 to thereby displace the water through the open drain. The primer pump 24 operates in the normal manner, in which upward movement of the plunger 32 due to the spring 34 creates a partial vacuum in the pumping chamber 22, thereby drawing liquid into the pumping chamber 22 through the inlet fitting 16 and the check valve 36. Since no air is introduced into the system, vent 60 remains closed. When the plunger is pushed downwardly viewing FIG. 1, the fluid content of the pumping chamber 22 is expelled into the passage portion 40 through the check valve 38.

From time to time the medium within the cartridge 14 lose their effectiveness and must be replaced. Accordingly, the cartridge 14 must then be removed from the housing 12 and replaced with a new cartridge. Removal of the cartridge is accomplished by unscrewing the housing 146 from the fitting 136 so that the probe assembly 128 is entirely removed from the fitting 136. The terminal assembly 170 is held onto the fitting 136 by the probe assembly and is removed with it. The entire cartridge 14 is then removed from the threaded stud 62 in the conventional manner. A new cartridge 14 is then installed on the stud 62 and tightened until the circumferentially extending seal 76 sealingly engages the housing 12. The portion 116 of the seal 114 is forced over the end of the stud 62 when the cartridge 14 is installed thereon and automatically engages the outer circumferential surface of the stud 62 to form a sealing connection therewith. The probe housing 146 and terminal assembly 170 are then installed on the fitting 136 on the new cartridge. When the cartridge is installed on the housing, the air in the new cartridge must be purged so that when the separating device is used in the fuel supply system of a diesel engine, the air in the cartridge will not be communicated to the engine to cause problems. Accordingly, the primer pump 24 is operated to pump fluid from the inlet fitting 16 into the new cartridge 14. As the cartridge 14 fills with the liquid mixture, the mixture eventually will begin coming out of the vent 60. At that time, the vent 60 is closed.

As discussed hereinabove, diesel fuel exhibits a phenomena known as "waxing" when it is cooled to a predetermined level. When waxing occurs, wax crystals form due to the paraffin in diesel fuels. These wax crystals in the diesel fuel cause problems when they are communicated through any filter or separator in the fuel line, because the wax crystals tend to act as a contaminant that plugs the filter or separating media thereby causing a fuel blockage or diminished flow through the filter or separating device. Although prior art fuel oil heaters have been used, they are relatively ineffective in preventing wax crystals from clogging the filter, because the heaters are only effective for the fuel in the area where the heater is installed. If the fuel filter/separator is blocked due to waxing, the heater is not effective because there is no way to communicate heated fuel oil through the filter/separator. Referring to FIG. 1, the batt of loosely packed fibrous filtering medium 100 which circumscribes the coalescing medium 84 tends to collect wax crystals on the fibers. Since the medium 100 is much less dense than is the medium 84, the wax crystals tending to collect on the fibers do not span the open pores of the batt-like material 100, thus protecting the tighter and more dense coalescing medium 84 from plugging during initial flow through the filter. When the pressure differential across the separator medium 102 becomes sufficiently great, such as would occur during wax crystals plugging the separating membrane, the relief valve 110 opens to permit fuel flow to bypass the waxed separator membrane 106. Accordingly, fuel flow through the cartridge is permitted, thereby permitting the heater 46 to heat the fuel flow and to permit the heated fuel flow to pass to the cartridge 14. Of course, the relief valve closes when the pressure level drops to an acceptable level due to the operation of the heater dissolving the wax crystals in the fuel.

We claim:

1. Separator cartridge for separating immiscible components of a liquid mixture comprising a casing having inlet and outlet connections adapted for communication to a liquid flow system, an annular coalescing medium within said casing for causing the liquid component to be separated from said mixture to agglomerate into liquid droplets, said coalescing medium having inner and outer surfaces, a sump defined within said casing for collecting the liquid to be separated from the liquid mixture, means in said casing for deflecting liquid flow through said inlet connection to the outer surface of said coalescing medium, a separating medium coaxial with said coalescing medium and located downstream of the latter so that the liquid mixture flows through the coalescing medium before reaching the separating medium, said liquid mixture flowing from the inner surface of said coalescing medium to said separating medium while allowing at least some of the coalesced liquid droplets of the liquid to be removed from said mixture to deposit in said sump, the surface of said separating medium being a material repellant to the liquid to be removed from said mixture so that droplets of the liquid to be removed deposit on said surface and fall into said sump while the other liquid of said liquid mixture passes therethrough, and pressure differential responsive means opening to permit said liquid mixture to bypass said separating medium when pressure differential across said separating medium attains a predetermined level, said pressure differential responsive means closing when the pressure differential drops below the predetermined level.

2. Separating cartridge as claimed in claim 1, including the baffle means between said coalescing medium and said separating medium for turning the flow of said liquid mixture after said liquid mixture leaves said coalescing medium.

3. Separating cartridge as claimed in claim 2 wherein said baffle means is a sleeve receiving said separating medium;

4. Separating cartridge as claimed in claim 1, wherein said separating medium is conical, and said pressure differential responsive means is a relief valve mounted in the tip of said conical separating medium and permits flow of said liquid mixture to bypass said separating medium when the pressure differential across said separating medium attains a predetermined level.

5. Separating cartridge as claimed in claim 4 wherein said coalescing medium comprises an annular array of radially tapering pleats circumscribed by a batt of randomly arrayed fibrous filtering material which is less restrictive to liquid flow than is the array of pleats.

6. Separating cartridge as claimed in claim 4, wherein said coalescing medium includes a more dense array of filtering material circumscribed by a less dense array of filtering material.

7. Separating device for separating immiscible components of a liquid mixture in which wax crystals form when the temperature is below a predetermined temperature, comprising a housing having inlet and outlet fittings for connection in a liquid flow system, a sump for collecting liquid separated from said mixture and means to effect separation of water from said mixture, said housing having a heating element for heating the liquid flowing through said device to a temperature above said predetermined temperature, said heating element being located in the flowpath in said housing between said inlet and outlet fittings, said separating effecting means including an annular coalescing medium within said housing, a separating medium in said housing arranged so that said mixture flows through said coalescing medium before reaching said separating medium, and pressure differential responsive means responsive to a predetermined differential pressure for permitting said liquid mixture to bypass said separating medium after said liquid mixture has passed through the coalescing medium and closing when said pressure differential across said pressure differential responsive means drops below said predetermined differential pressure, said predetermined differential pressure being set at a pressure level at which the wax crystals in the liquid mixture may cause said separating medium to be restricted by said wax crystals, said pressure differential responsive means closing when a sufficient quantity of the liquid mixture has been bypassed around said separating medium to permit the liquid heated by the heating element to reach the separating medium at which time the pressure differential across said pressure differential responsive means drops below said predetermined differential pressure.

8. Separating device as claimed in claim 7, wherein said heating element is located within a circumferentially extending duct in said housing, and means for communicating said liquid mixture into said duct for flow therethrough.

9. Separating device as claimed in claim 8, including means to supply electrical energy to said electrically resistive material.

10. Separating device as claimed in claim 7 wherein said housing includes a manually operable pump for moving the liquid mixture from said inlet fitting to said outlet fitting, a manually operable vent at said outlet fitting to permit air to escape from said cartridge when said pump is operated, and a manually operable drain cock on said sump to permit operation of said pump to force the separated liquid from said sump through said drain cock.

11. Separating device as claimed in claim 7, wherein said coalescing medium includes a batt of randomly arrayed fibrous filtering material circumscribing a second filtering material which is more restrictive to liquid flow than is said batt.

12. Separating device as claimed in claim 7, wherein said heating element is mounted in a circumferentially extending duct in said housing, means for communicating said liquid mixture into said duct for flow therethrough and from said duct to the inlet connection to the cartridge, and means to supply electrical energy to said ring.

13. Separating device as claimed in claim 12, wherein said heating element includes a pair of positive temperature coefficient elements mounted in said duct.

* * * * *

UNITED STATES PATENT AND TRADEMARK OFFICE
CERTIFICATE OF CORRECTION

PATENT NO. : 4,437,986

DATED : March 20, 1984

INVENTOR(S) : Donald I. Thornton, Richard H. Peyton, and Charles K. Hutchins

It is certified that error appears in the above-identified patent and that said Letters Patent are hereby corrected as shown below:

Column 5, line 28: "prove" should be "probe".

Signed and Sealed this

Twenty-sixth Day of February 1985

[SEAL]

Attest:

DONALD J. QUIGG

*Attesting Officer*  *Acting Commissioner of Patents and Trademarks*